March 3, 1970      N. R. HENRY      3,498,395
AUTOMATIC FEED CONTROL FOR HIGH SPEED WEIGHING
Filed March 17, 1967
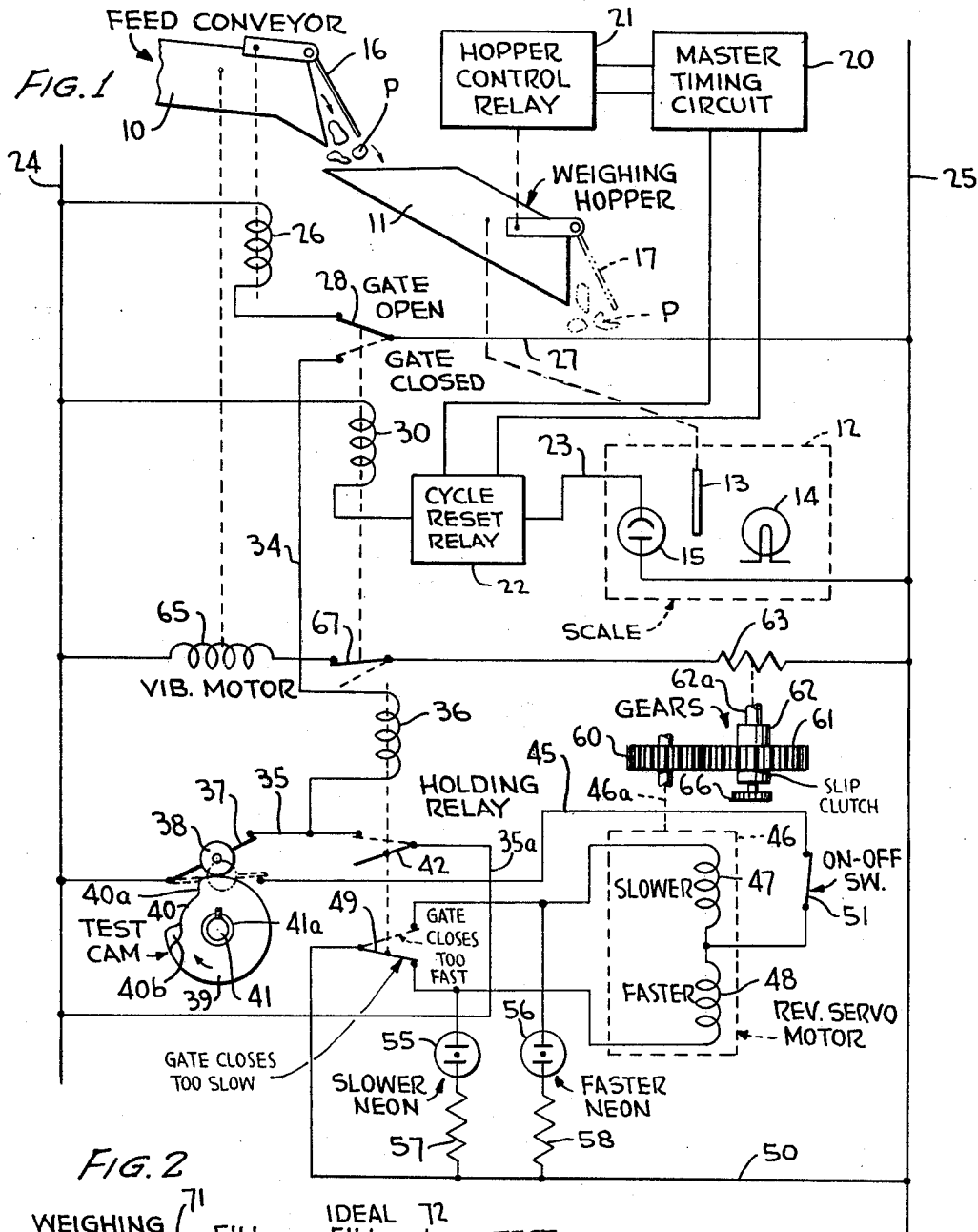
INVENTOR,
NELSON R. HENRY
BY
Watson, Cole, Grindle & Watson
ATTORNEYS United States Patent Office 3,498,395
Patented Mar. 3, 1970

3,498,395
AUTOMATIC FEED CONTROL FOR HIGH
SPEED WEIGHING
Nelson R. Henry, Decatur, Ga., assignor to The Woodman
Company, Inc., Decatur, Ga., a corporation of Georgia
Filed Mar. 17, 1967, Ser. No. 623,900
Int. Cl. G01g 9/00, 17/00, 19/00
U.S. Cl. 177—1
14 Claims

ABSTRACT OF THE DISCLOSURE

An apparatus and method for detecting the direction for a desired feed rate correction in a high speed weighing operation and applying a fixed correction during a feed rate correction period of each cycle. The correction is determined by a test cam having a fixed dwell period operating a microswitch connected to a reversible servo motor for ultimately controlling the speed of the feed conveyor; the detection being performed by comparison of the cut-off of the feed to the scale hopper in response to the scale making weight and the start of the test period. A gear train with built-in backlash is combined with the servo motor to effect a delay during each first correction of a series in a single direction.

The present invention relates generally to high speed weighing systems and, more particularly, to an apparatus and method for maintaining constant weight of material on successive weighing cycles.

Many attempts have been made to monitor and correct for variation in feed rate of product in weighing systems of the type wherein successive cycles are required to be both high speed and accurate. Such a system has proven to be mandatory in the conventional form-and-fill packaging machines which are operative to feed a controlled stream of product along a series of in-line conveyors to obtain a relatively homogeneous flow, weigh the product in batches as it is fed from the final conveyor, and then deposit each batch into the formed container. For example, it is known that food products, such as potato chips or the like, which are primarily envisioned as being adapted for weighing in accordance with the present invention, make it impossible to obtain the relatively thin, homogeneous flow that is the most conducive to accurate weighing without a constant monitoring and regulation of speed of the feed conveyor. This, in turn, greatly complicates weighing these products for accuracy with optimum speed because of the inherent variation in the amount of product in-flight to the weighing hopper when the firing point of the scale is reached and the conveyor gate is closed. As is well known in the art, this variation is due primarily to the accumulation of foreign matter on the feed conveyors and fluctuation of line voltage.

The large majority of the prior art attempts have, insofar as I am aware, attacked the problem by providing separate fast and slow feed periods in the weighing cycle, which depend upon the movement of the scale, and thus in turn, depend on the feed rate of the material along the conveyors. Further, each of the prior art attempts has included the theory that the amount of correction of the feed rate should be made in proportion to the amount of the error on the cycle being tested with the thought that the successive cycles should be corrected exactly in accordance with the error which occurred on the previous cycle. An example of this type of arrangement is shown in the patent to Stone 3,091,301, issued May 28, 1963.

One problem that has arisen with the use of this type of prior art system is keeping the weighing cycle in timed relationship with the remainder of the machine. This has proven to require considerably more circuitry and mechanical relays, which of course raises the initial cost and hinders the reliability of the system. Also, it has been found that such a system occasionally results in a considerable slowing down of the packaging machine while waiting on the variable weighing cycle to be concluded. Further, weight inaccuracies have been found to occur frequently in these systems, which is throught to be due primarily to what can be referred to as a "hunting" of the control system when a need for a correction is detected by the system. In other words, if a relatively large error occurs in the feed rate for one cycle a proportionally large correction is made in these prior systems so that on the next succeeding cycle the same large correction in the opposite direction is needed whereby the control system begins to oscillate back and forth between the limits of adjustment of the apparatus.

Accordingly, it is one object of the present invention to provide a weighing system and method wherein fixed, predetermined corrections are made during each cycle of operation to compensate for any tendency of the feed rate to vary.

Another object of the present invention is to provide such a system wherein the overall weighing cycle is fixed and controlled by a master timing circuit so that said system can be easily kept in step with other operations, which for example, are present in a packaging machine.

A further object of the present invention is to provide a weighing system with built-in automatic feed rate correction which is not subject to "hunting," so as to allow considerably faster operation over large runs, and is more accurate, simpler in construction, and more reliable in operation.

Thus, in accordance with the present invention, there is provided a weighing system that has a predetermined weighing cycle including means for setting a predetermined test or feed rate correction period during each cycle, means for detecting the direction for a desired feed rate correction, and means responsive to the detecting means and operative during the fixed test period for regulating the operation of the conveyor so that a fixed feed rate correction, rather than a variable one, is made during each cycle of operation. This, in effect, has the end result of correcting the cycle a relatively small, fixed amount in the direction which has been detected regardless of the amount of feed error which has occurred on the monitored cycle. This has been found to provide a flexible correction that is more nearly an averaging of variations which inherently occur in the material and thus to cause a correction only when there is a definite tendency toward a feed rate error over a series of successive cycles. Furthermore, with the elimination of the cause for "hunting" in the system, the feed of the product is greatly stabilized insuring that the desired weight can be made within the predetermined fixed time for each cycle, while on the other hand, insuring that the weight is not made too soon. This means that it is now possible to shorten the fixed weighing cycle while maintaining maximum accuracy thus allowing the packaging machine to run at optimum speed.

Another feature of the invention is concerned with the provision of a novel delaying means which is incorporated in the system that causes at least a portion of the first correction of a series in a single direction to be deleted so as to further insure that an actual correction is made only when there is a tendency toward an error in the feed rate. Thus, in the case where the flow of material is substantially constant and the scale is making weight at the selected point in the weighing cycle, the amount of actual correction is reduced or eliminated. In the preferred embodiment illustrated, this delaying means takes the form of built-in backlash in a train of gears which connects a reversible servo motor to a variable resistor that controls the speed of the conveyor motor.

Still other objects and advantages of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modification in various obvious respects, all without departing from the invention. Accordingly, the drawings and description are to be regarded as illustrative in nature, and not as restrictive.

In the drawings:

FIGURE 1 is a schematic diagram of a weighing system incorporating a feed rate correction circuit, all in accordance with the teachings of the present invention; and FIGURE 2 is a time graph showing the operation of the various components of the system illustrated in FIGURE 1.

With specific reference now to the schematic diagram of FIGURE 1 for a more detailed description of the in-the usual manner to deposit a product P into a weighing hopper 11. As shown, the product P may be in the form of individual solid pieces, such as potato chips or the like; however, it is to be understood that the present invention could be used for controlling the feeding and weighing of other types of material, such as particulate solids or liquids. The weighing hopper 11 is mounted on the scale pan of a scale 12, which may take the form of a photoelectric weigher as described and claimed in the copending application of White, Ser. No. 573,063, and assigned to the same assignee as the present invention. As such, the scale 12 comprises the usual actuating flag 13 interconnected with the weighing hopper 11 so that when the light beam from light source 14 is interrupted, the internal resistance of photoelectric cell 15 rises and is thus fired, as fully described in the aforementioned copending application.

The feeding of product P from the feed conveyor 10 is controlled by the pivotal gate 16 and the interruption of power to said conveyor 10 with the intermittent dumping of the weighed batches of product P from the weighing hopper 11 being controlled by a similar pivotal gate 17. As is well known in this art, the conveyor 10 is or may be the final conveyor in a series of conveyors that serves to thin out the product P into a continuous, homogeneous flow so that when the conveyor gate 16 is in the open position, as shown by the full line position of FIGURE 1, the product P is flowing with regularity into the weighing hopper 11. When the scale 12 has made weight as signalled by the firing of the photoelectric cell 15, the gate 16 is closed to terminate the feed and the gate 17 is opened to dump the weighed batch into a suitable container (not shown).

To do this in accordance with the present invention, a master timing circuit 20 is utilized from the control system of the packaging machine or similar machine to open and close the hopper gate 17 through a hopper control relay 21 at the beginning of each weighing cycle. It is noted that the hopper control relay 21 is regulated for maximum operation efficiency so as to hold the gate 17 open only for the length of time required to exhaust the hopper 11 in readiness for the next filling operation of the conveyor 10. The initiation of this filling operation is, in turn, also controlled by the master timing circuit 20 by a cycle reset relay 22 which is connected with the photoelectric cell 15 of the scale 12 by a lead 23 that is supplied with electrical potential by connection across input power lines 24, 25. The reset relay 22 is or may be a conventional binary circuit or other flip-flop device which is designed to establish a flow of current through the lead 23 in response to the proper signal from the master control circuit 20 at the beginning of each cycle of operation. Then when the flag 13 interrupts the light beam to the photoelectric cell 15 thereby raising the internal resistance of said cell 15, the reset relay 22 switches back to interrupt the flow of current.

The conveyor gate 16 is operated by a solenoid 26 which is also connected across the input lines 24, 25 by an electrical lead 27. A switch 28 is included in this circuit to control this solenoid 26 to thus open and close the gate 16 at the proper time in the cycle. To so operate the switch 28, there is provided a relay solenoid 30 in the circuit with the reset relay 22 and the photoelectric cell 15. At the start of each weighing cycle (as determined by the reset relay 22) light will shine on the photoelectric cell 15 thus lowering the resistance in the same to switch the reset relay 22 and energize the solenoid 30 thereby positioning the switch 28 in the full line position and thus opening the gate 16. As mentioned above, when the scale 12 detects the desired weight, the actuating flag 13 interrupts the light beam thus causing a raising of resistance in the photoelectric cell 15 thereby switching the reset relay 22 to interrupt the flow of current and deactivate the solenoid 30 thus allowing the switch 28 to move to the dotted line position to close said gate 16.

In this latter or gate closed position, the switch 28 is operative to form a circuit from the lead 27 through a connecting lead 34 and two branch lines 35, 35a to operate a detector relay solenoid 36. The branch line 35 is controlled by a microswitch 37, the position of which is determined by a suitable cam follower 38 operated in a periodic manner by a test feed rate correction cam 39 having a dwell portion 40.

The cam 39 is fixed on a shaft 41 by a locking collar 41a and said shaft is driven by any suitable portion of the packaging machine so as to rotate through one complete revolution during each weighing and packaging cycle. The dwell portion 40 can, if desired, be formed with a let down slope denoted at 40a that is fixed across the cam, and a take up slope 40b which is infinitely variable across the width so that the test period, as determined by the operation of the microswitch 37, may be adjusted for a purpose which will later be explained. This is accomplished by loosening the locking collar 41a and axially and/or rotationally shifting the cam 39 until the proper length test period is selected whereupon the collar 41a is again tightened in readiness for operation.

In operation, upon detecting weight being made in the weighing hopper 11 and the movement of the switch 28 to the dotted line or gate closed position, if the microswitch 37 is at this point still in the full line position, relay solenoid 36 is energized which thereby results in holding relay switch 42 being moved to the dotted line position thereby completing a circuit through the branch line 35a. Accordingly, once the circuit is initiated through the lead 34 and the branch line 35, the holding relay switch 42 will insure the circuit being maintained until the reset relay 22 is reclosed at the beginning of the next cycle, which, it will be remembered, reenergizes the solenoid 30 and repositions the switch 38 in the gate open position.

When the microswitch 37 moves to the dotted line position due to the cam follower 38 dropping into the dwell portion 40 of the cam 39, a circuit is completed through a lead 45 to a reversible servo motor 46. The motor 46 includes a pair of windings 47, 48 for operating its output shaft 46a in either forward or reverse direction. The circuit is completed through a selector switch 49, and interconnecting lead 50; said switch 49 being operative to select one or the other of the windings 47, 48 for operation. To accomplish this selecting function, the switch 49 is connected to the armature of the solenoid 36 so that it is operated in conjunction with the holding relay switch 42.

As a result, if during the weighing operation the scale 12 does not make weight before the microswitch 37 reaches the dwell portion 40 of the test cam 39 because of a slow rate of feed of product P from the conveyor 10, the solenoid 36 is not energized and the switch 49 remains in its full line position so that the winding 48 is selected for operation. It should be noted at this point, that since the dwell portion 40 has been previously selected and is fixed in length and since the shaft 41 is rotating at a constant speed, the winding 48 is energized for a fixed, predetermined time. This means that output shaft 46a of the motor 46 rotates in a first direction for a fixed period of time.

If, on the other hand, the scale 12 makes weight sooner than expected because of a relatively fast feed of product P into the weighing hopper 11, the switch 28 moves to the dotted line position so as to close the gate 16 before the test microswitch 37 is moved from the full line position whereby the detecting circuit is completed through the leads 27, 34, 35 and 35a, as previously described, and the solenoid 36 is actuated to move the selector switch 49 to the dotted line position to thereby select the winding 47 for operation of the motor 46 when the test microswitch 37 reaches the low dwell on cam 39.

A main on-off switch 51 may be interposed in the lead 45 so that the system may be interrupted as desired. With the switch 51 placed at this point the remainder of the system can remain in a stand-by operative condition for immediate resumption of the correction function by the operator merely throwing the switch 51. For indicating the mode of correction being made by the motor 46 at any particular time, there is provided a pair of neon signal lights 55, 56 with companion resistors 57, 58. It will be clear that when the winding 47 is in operation by positioning of the switch 49 in the dotted line position, the neon light 55 is energized through the opposite winding 48 and lead 50. Similarly, when the winding 48 is in operation, the neon light 56 is energized through the winding 47 and the lead 50.

To translate the reversible rotation of the motor 46 to control of the feed conveyor 10, the output shaft 46a carries a small driving gear 60 which meshes with a larger driven gear 61 which is, in turn, drivingly coupled through a slip clutch 62 to a control shaft 62a that operates a rheostat or variable resistor 63; it being understood that the frictional engagement within the clutch 62 is sufficient to operate said rheostat 63 over its normal operating range but allows slippage if the limits of adjustment are reached. An adjusting knob 66 is directly connected to the control shaft 62a and because of the presence of the slip clutch 62, manual overriding adjustment of the rheostat 63 may be made at any time. In either the automatic or manual mode, the rotation of the control shaft 62a serves to vary the position of the movable pointer of the rheostat 63 in the usual manner so as to vary the amount of current flowing through the vibrator motor 65 which serves to feed the product P along the conveyor 10. A switch 67 operated by the solenoid 30 effects complete interruption of the flow of current to the vibrator motor 65 during the time when the gate 16 is closed.

In accordance with an important feature of the present invention, the gears 60, 61 are formed so as to have a predetermined amount of built-in backlash. That is, the actual driving engagement between the gears 60, 61 is delayed momentarily at the beginning of each first rotation of the motor 46 in a single direction. In fact, it may be desirable in some instances to specifically select the dwell portion 40 of the cam 39 and the backlash of the gears 60, 61 to exclude any correction for each first correction detected in a single direction. In other words, if there is no valid tendency for the system to run slow or fast, no correction is made since the gear 60 will in this case oscillate idly back and forth without effecting a driving arrangement with the gear 61.

Thus, this arrangement has the particular advantage of delaying the operation of the rheostat 63 for all or part of a single correcting cycle which means that the full correction of the circuit does not take place until at least two successive corrections in a single direction have been detected.

Thus, at the start of each cycle, assuming that the product P is flowing normally along the conveyor 10 and that the weighing hopper 11 has at the moment a full charge of product P, the master timing circuit 20 operates the hopper control relay 21 to open the hopper gate 17 so as to dump the weighed batch into the waiting container. Advantageously, this dumping operation is performed over a fixed period of time and is as short as possible as indicated by the cross-sectioned area $t_0$–$t_1$ in the time graph of FIGURE 2. As soon as the batch has been removed from the hopper 11 at $t_1$, the master timing circuit 20 initiates the refilling of the hopper 11 by actuation of the cycle reset relay 22, as explained above and as can be noted by time reference line 70 in FIGURE 2. It is pointed out that since both the initiation of the dumping operation and the filling operation are under control of the master timing circuit 20, it is possible with the apparatus of the present invention to slightly overlap thess operations by merely adjusting said circuit 20 to open the gate 16 and reestablish power to vibrator motor 65 at the point indicated by reference line 71 since, as is clear, it will take a certain amount of time for the product P to move between the discharge lip of the feed conveyor 10 and the lower end of the weighing hopper 11 adjacent the gate 17. This, of course, allows a further compaction of the weighing cycle and thus more weigh-offs per unit time for still greater efficiency.

It will be remembered that the cam 39 is rotating at a preselected speed and in step with the packaging machine so that the test microswitch 37 is opened at a preselected point $t_2$ during the weighing cycle, which denotes the preferred or ideal point in the cycle for terminating the filling operation, as indicated by the reference line 72 in FIGURE 2. In other words, the period of time $t_1$–$t_2$ is the preselected time in which the weighing hopper 11 should make weight and thus is considered to be the ideal feed rate. This point $t_2$ also indicates the test period $t_2$–$t_3$, which is as stated a fixed period of time as determined by the length of the dwell portion 40 and denoted by the cross hatched area on the graph.

To determine the direction in which the feed correction is to be made, the point $t_2$ or the start of the test period $t_2$–$t_3$ is compared to the actual fill stop or gate closed point, as determined by the firing of the scale 12, and denoted for example by additional too fast and too slow reference lines 73, 74, respectively. In other words, if the switch 28 is still in the gate open position when the point $t_2$ is reached, or too slow as compared to the ideal, the microswitch 37 has opened the circuit through the branch lead 35 thus preventing the completion of a circuit through the solenoid 36 whereby the switch 49 remains in the full line position for energizing the winding 48 of the servo motor 46. Thus, in the case given, this winding would effect the rotation of the output shaft 46a so as to move the adjustable pointer of the rheostat 63 in the direction to increase the current flow through the vibrator motor 65 and thereby increase the speed of the conveyor 10 to shorten the fill time on succeeding cycles and approach the ideal stop $t_2$, 72.

If, on the other hand, the switch 28 is moved to the gate closed position before the test cam 39 operates the microswitch 37 at $t_2$, then there is detected a feed rate which is too fast and the fill stop point 73 must be moved forward toward the ideal point at 72. In this case, the switch 49 is positioned in the dotted line position by the solenoid 36 to complete the circuit through the winding 47 to rotate the output shaft 46a in the opposite direction from before. This of course moves the adjustable pointer of the rheostat in the appropriate direction to decrease the flow of current through the vibrator motor 65.

It should be noted that during each cycle of operation there is thus provided in accordance with the present invention, a fixed period of correction $t_2$–$t_3$ so that there is no chance of overcorrecting the rheostat 63 thus allowing the vibrator motor 65 to assume a position which could cause a wide variation in the feed of the material as has occurred in prior art proportional correction arrangements. In other words, with only a fixed correction during each cycle there is no possibility of obtaining too great of a correction in response to the detection of a feed rate variation in a single cycle.

It has been found that the ideal fill stop point $t_2$ is positioned in the most advantageous point of the cycle at a point approximately 70% of the complete cycle. With this arrangement approximately 30% of the cycle, that is $t_2$–$t_0$, is given to complete weight if the feed of the material is slow, which has been determined to be sufficient for this function under all normal operating conditions, and in addition, to still insure that the shortest possible weighing cycle is maintained for the greatest operating efficiency.

The most desirable fixed test cam period $t_2$–$t_3$ has been found to be around 10% of the total cycle; however, this factor is of course dependent on many variables, including the gear ratio of the gears 60, 61 and the relative effectiveness of the rheostat 63. The proper test period can, in any case, be easily selected for this purpose of gaining the optimum control of the feed by adjusting the cam 39 as explained above. As an example of the efficiency of the overall cycle in accordance with the present invention and these percentage figures, it is now possible to operate successive two second weighing cycles with a 0.2 correction period during each cycle without incurring any dry cycles due to an expiration of the fixed weighing period ($t_1$–$t_0$) prior to making weight.

It will be realized from the foregoing discussion, that the relatively small, fixed feed rate correction that automatically occurs during each cycle of operation is capable of making rather large adjustments after operation in one direction over a number of cycles. However, there are certain abrupt changes in feed demand where it is preferable for the operator to manually set the initial approximate operating speed of the vibrator motor 65 that has been proven by experience will be required. Such changes normally occur, for example, when a change-over in the size of the bag to be filled is made and when the packaging operation is initiated at the start of the day after cleaning the conveyors 10, 11 of the accumulated, product-retarding residue left from the previous day's operation. This is accomplished in accordance with the present invention by the operator merely setting the knob 66 in the desired position whereby the proper weighing cycle is immediately assumed thus eliminating the need to wait for the relatively small incremental corrections of the feed control system to perform this initial adjustment.

In summary, some of the most important advantages of the present invention include the operation of the entire weighing operation in step with the associated machine and the making of the desired feed correction over a fixed period of time in the detected direction rather than making a correction for the full amount of variance as in the prior art. This means that the speed of the overall operation is enhanced and that the feed of the product is stabilized due to the novel concept of correcting a tendency of the feed conveyor 10 to run fast or slow, which insures that one particular slow or fast cycle caused by a temporary nonhomogeneous flow does not throw the system into wide variation or a "hunting" mode. Furthermore, by providing built-in bashlash in the gears 60, 61, it is further insured that the occasional slow or fast cycle will not cause an undesirable correction in the system since with each first correction in a single direction there may be little or no operation of the rheostat 63 due to this backlash.

In this disclosure, there is shown and described only the preferred embodiment of the invention, but, as aforementioned, it is to be understood that the invention is capable of various changes or modifications within the scope of the inventive concept as expressed herein.

I claim:
1. A high speed automatic weighing system for maintaining constant total weigh of material on successive weighing cycles comprising a weighing scale, a hopper on said scale, conveyor means for feeding material to said hopper in a single operation, means for terminating the flow from said conveyor during the latter portion of a cycle in response to detection of said total weight by said scale, means for initiating a fixed feed rate correction period at a fixed point during each cycle, means for detecting the direction for a desired feed rate correction, and means responsive to said detecting means and operative during said correction period for regulating the operation of said conveyor for the next cycle, whereby a fixed feed rate correction for succeeding cycles is made during each cycle of operation.

2. The combination of claim 1 wherein is further included means for delaying the operation of said regulating means only during a portion of the first correction of a series in a single direction.

3. The combination of claim 1 wherein said regulating means includes a motor having first and second windings in opposite directions, a gear train connected to said motor and a variable resistor selectively positionable by said gear train for varying the speed of said conveyor, and said detecting means comprises a relay switch for selecting the appropriate one of said windings during each correction period, and wherein is further provided a slip clutch interconnecting said gear train and said regulating means and manual adjustment means directly connected to said resistor for allowing overriding adjustment independent of said gear train.

4. The combination of claim 1 wherein said initiating means includes a cam having a fixed dwell period, an electrical circuit connected to said regulating means for operating the same, and a switch responsive to said dwell period to close said circuit for a fixed time.

5. The combination of claim 4 wherein is provided means for adjusting the fixed dwell period to insure optimum amount of correction being made on the succeeding cycles.

6. The combination of claim 1 wherein said regulating means includes a motor having first and second windings in opposite directions, a gear train connected to said motor and a variable resistor selectively positionable by said gear train for varying the speed of said conveyor, and said detecting means comprises a relay switch for selecting the appropriate one of said windings during each correction period.

7. The combination of claim 6 wherein said gear train includes built-in backlash whereby the positioning of said variable resistor is delayed only during a portion of the first correction of a series in a single direction.

8. The combination of claim 6 wherein is further provided neon indicators connected in series with each of said windings and in parallel with said relay switch whereby to indicate the correction mode of operation.

9. The combination of claim 1 wherein the terminating means includes a gate on said conveyor, an electrical circuit, a control relay in said circuit for operating said conveyor gate in response to the detection of said total weight, and a cycle reset relay in said circuit and wherein is further provided a master timing circuit for said system for operating said reset relay for automatically initiating each weighing cycle after a fixed time period whereby each cycle is the same.

10. The combination of claim 9 wherein said weighing hopper includes a gate for dumping said product after the weighing operation, a second control relay for operating said hopper gate, said second relay being controlled by said master timing circuit whereby the operation of said hopper gate may be independently adjusted with respect to the weighing cycle.

11. The combination of claim 9 wherein said terminating means includes a photoelectric cell in said circuit, a source of light for directing a beam of light toward said photoelectric cell, and a flag mounted on said hopper for breaking said beam of light.

12. A method of maintaining constant total weight of material on successive weighing cycles comprising the steps in each cycle of feeding said material along a conveyor and into a weighing hopper in a single operation, weighing said material in said hopper, terminating the feed of said material during the latter portion of said cycle when said total weight is made by said weighing, initiating a fixed feed rate correction period at a fixed point in each cycle, detecting the direction for a desired feed rate correction, and regulating the speed of said conveyor for the next cycle during said correction period to control the flow rate of said material for each succeeding cycle in response to the feed rate correction detected.

13. The method of claim 12 wherein the detecting step is performed by comparing the point in time of the initiation of the interrupting step to the initiation of said correction period 14. The method of claim 12 wherein the regulating step is delayed only during a portion of the first correction of a series in a single direction.

References Cited

UNITED STATES PATENTS

| | | | |
|---|---|---|---|
| 2,037,484 | 4/1936 | Raymer et al. | 177—50 |
| 2,050,496 | 8/1936 | Mayo | 177—50 |
| 2,434,177 | 1/1948 | Richardson | 177—46 |
| 2,597,831 | 5/1952 | Willis | 177—108 |
| 2,933,281 | 4/1960 | Hyde et al. | 177—121 |
| 3,091,301 | 5/1963 | Stone | 177—1 |
| 3,108,647 | 10/1963 | Harmon et al. | 177—121 X |
| 3,369,620 | 2/1968 | Garnatt | 177—50 X |

FOREIGN PATENTS

| | | |
|---|---|---|
| 529,925 | 9/1956 | Canada. |

RICHARD B. WILKINSON, Primary Examiner

G. H. MILLER, JR, Assistant Examiner

U.S. Cl. X.R.

177—46, 121; 222—56